June 6, 1950  C. A. VOSSBERG  2,510,485
ELECTRICAL MEASURING SYSTEM
Filed Nov. 8, 1945  4 Sheets-Sheet 2

INVENTOR.
Carl A. Vossberg
BY S. Stephen Baker
ATTORNEY

June 6, 1950 C. A. VOSSBERG 2,510,485
ELECTRICAL MEASURING SYSTEM

Filed Nov. 8, 1945 4 Sheets-Sheet 4

INVENTOR.
Carl A. Vossberg
BY S. Stephen Baker
ATTORNEY

Patented June 6, 1950

2,510,485

UNITED STATES PATENT OFFICE 2,510,485

ELECTRICAL MEASURING SYSTEM

Carl A. Vossberg, Lynbrook, N. Y., assignor to Standard Electronic Research Corporation, New York, N. Y.

Application November 8, 1945, Serial No. 627,476

15 Claims. (Cl. 177—337)

1

This invention relates to electronic measuring devices and more particularly to an apparatus adapted for counting, metering, or computing.

One of the objects of this invention is to provide a high speed counter having a high degree of accuracy and versatility, and providing a visual indication of the actual number or other result of the measurement.

Another object of the invention is to provide such a device capable of counting a series of applied numbers, values or impulses, and being capable of adding further numbers, values, or impulses thereto so that a final count may be derived. Thus, the function of an electronic adding machine or like apparatus may be served.

Another object of this invention is to provide a device for measuring the frequency of a wave of energy, or the interval between two or more successive operations. Such measurement of interval is accomplished by performing the reverse function of a frequency meter since it is apparent that the number of cycles from a known frequency source which occurs during said interval is a measurement of the time of the interval. The instant invention is further adaptable for measuring accurately and precisely voltage, and in fact any form of intelligence which can be converted into electrical pulses or which can be arranged to charge or discharge a capacitor or the like to a degree commensurate with the subject being measured. The invention further provides a device for measuring the phase relationship between two wave motions, one of which may be an electrical oscillation, while the other may embody a cyclical variation whether electrical, mechanical, or both.

A further object of this invention is to provide an electrical counting device which can be interconnected with other counters as in a cascaded arrangement, so as to perform the duties of a larger counter.

Another object of this invention is to provide a compact and largely automatic apparatus for receiving counts at extremely high speeds and thereafter providing an accurate visual indication of the quantity or character of the received counts. Allied with this object is the provision of such an apparatus capable of addition, subtraction, and inherently capable of performing the usual mathematical functions of computing machines. The visual indicating means of the device is further arranged to occupy a small area, is simple in mechanical construction, and is of a clarity whereby the results of the machine's operation may be conveniently and easily read or applied to a recording apparatus.

Other objects of my invention will be apparent from the following description, it being understood that the above general statements of the objects of my invention are intended to describe and not to limit it in any manner.

For the purposes of illustration, the description of the invention herein will be principally directed toward its use as a frequency measuring system although other applications will be described or will be understood by those skilled in the art.

Referring to the drawings, Fig. 1 is a schematic circuit and block diagram illustrating two connecting or cascaded channels, in the system herein described, similar channels being utilized for each digit or character in the counted result.

Figure 7:
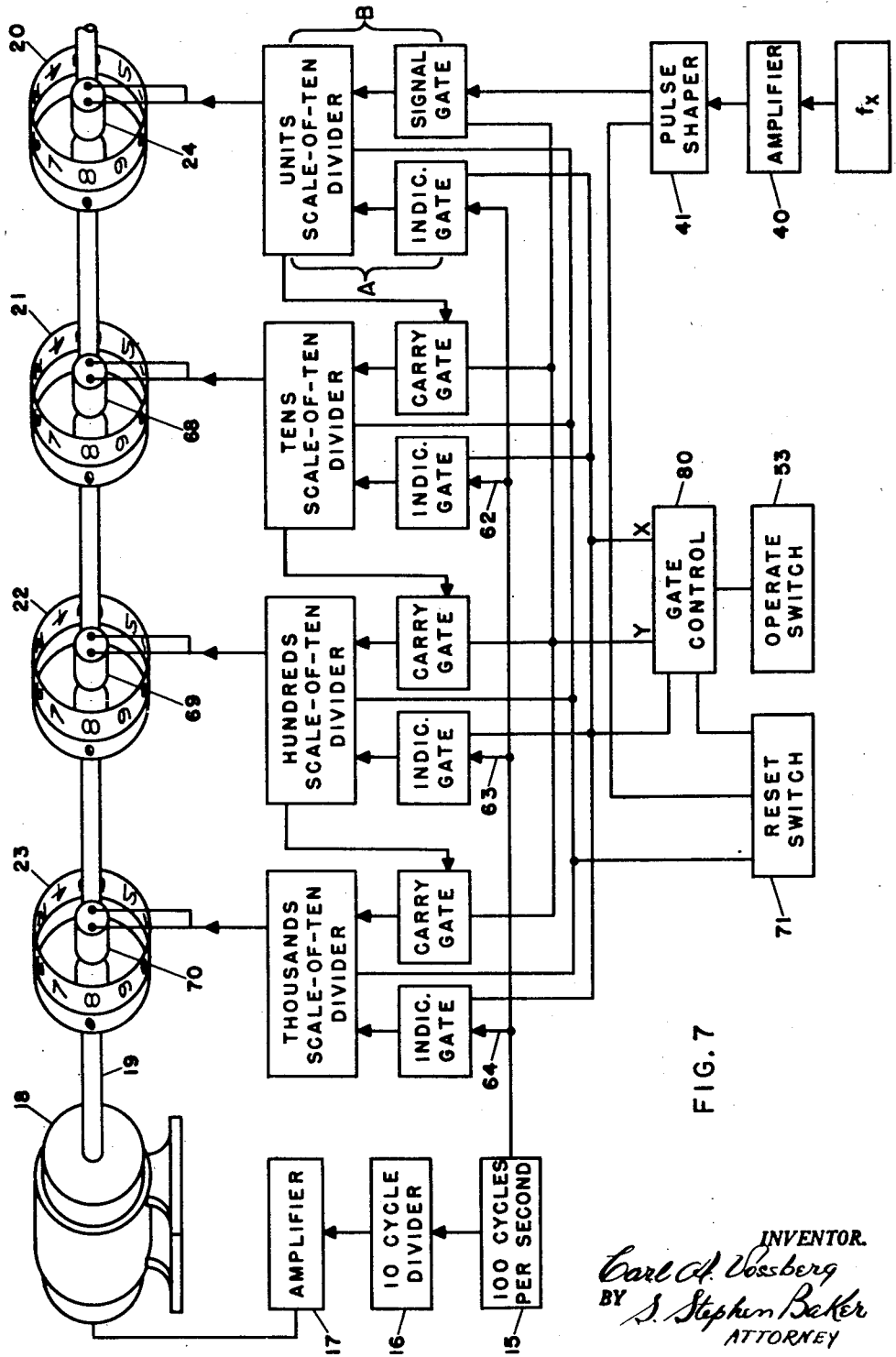
Fig. 7 is a block diagram illustrating a complete counting apparatus and showing the interconnection of the several cascaded channels.

Referring now to Fig. 7 of the drawings, 15 represents a highly stable frequency source which, for purposes of convenience, is shown as providing a wave having a frequency of 100 cycles and which is used for synchronizing the indicating system as hereinafter set forth. Means of attaining such a reference frequency is apparent, one preferred method comprising stepping down the frequency from a crystal oscillator by means of multivibrators. However, a tuning fork, a magnetostriction type of oscillator, or any other frequency generator or oscillator may be employed.

Control pulses, the function of which will be hereinafter described, and which are particularly useful in frequency measuring, are obtained through frequency divider 16 which may take the form of a 10 cycle mutivibrator controlled by frequency source 15. The output of divider 16 is amplified at 17 so as to provide driving power for synchronous motor 18. The shaft 19 of motor 18 bears the count indicating or indicia bearing wheels 20, 21, 22 and 23, which may be keyed thereto for uniform rotation. Although four such indicating wheels are illustrated, it will be apparent that a complete counter may embody seven or more such wheels so as to have a counting capacity of a million or more. However, it will be understood that the function for which the device is utilized will determine the desired capacity. Each wheel is numbered from zero to nine along its periphery when the device is employed as a measuring system. In other applications the wheels may bear any suitable type of indicia such as letters or symbols if applicable.

Each count indicating wheel is provided with its own channel for determining the particular number of that wheel to be rendered visible or apparent so as to translate the intelligence applied to it. Each such channel is dual in form having two sections so as to permit the counts or pulses to be selectively absorbed or applied to the indicating system. In this manner the apparatus is continuously functioning to either receive counts or to indicate the result, the selection being accomplished by actuating either section of each dual channel as hereinafter described. Each scale-of-ten divider is common to both channel sections so as to be incorporated in their circuits. Thus one channel section comprises an indicating gate and divider while the other channel section comprises a signal gate and divider.

Each indicia bearing wheel is associated with neon tubes 24, 68 and 69 and 70, which are adapted to render a particular portion of the wheel visible through stroboscopic action. Since the wheels are rotated by the synchronous motor 18 at 600 R. P. M., each wheel makes one revolution every one tenth of a second. If a neon tube, which supplies short flashes of illumination, is flashed once for every revolution of the disk, and in synchronism therewith, only one number or other indicia appearing on the wheel will be illuminated so as to be observed by the operator. In a normal period prior to the application of counts to the apparatus, the neon tubes may be adapted to flash so as to illuminate the zeros on the counting wheels, assuming that they are numbered from zero to nine around their peripheries. In this condition it may be considered that the neon tube actuating circuit is in phase with the cyclical rotation of the counting wheels 20 to 23 as well as in synchronism therewith. As long as these circuits are thus in phase, the number zero will always appear on the wheels. In the event this phase relationship is caused to vary by the application of the subject to be measured, a different number will be rendered visible upon any wheel in which this phase change has been accomplished. It will also be understood that subsequent to a changed phase relationship by the introduction of a value to be measured, the synchronous motor 18 maintains the wheels in synchronism with the neon tubes, so that the new number or symbol rendered apparent on any wheel remains thus visible until further counts are added or until a reset device restores the original phase relationship of each neon tube and wheel so that zeros once more appear thereon.

In the preferred embodiment illustrated herein each neon tube is actuated by charge of a capacitor after gradual discharge thereof according to the value of the received counts. At the instant that the capacitor is recharged, as will be hereinafter described, a pulse is delivered to the neon tube so as to flash it. The application of ten counts or equivalent voltage to the fully charged capacitor is arranged to effect a discharge thereof whereupon the circuit completely recharges the capacitor so as to produce a flash of the neon tube. Since the neon tube circuit and the rotating wheel arrangement are actuated from a common source, and by virtue of the scale of ten divider above described, it may be considered that the neon tubes circuit and the rotating wheels are of the same frequency in operation.

Figure 2:
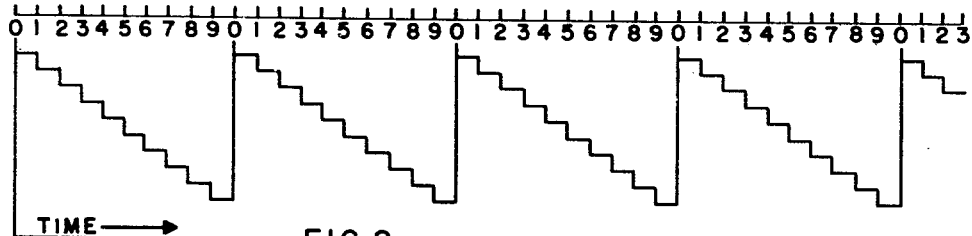
Fig. 2 is a graphical illustration of the activity of each counter channel during either idle or indicating periods when counts are not being applied thereto.

The principles embodied in this invention are graphically illustrated in the time developed views of Figs. 2 to 6. The short vertical lines on the top horizontal axis represent synchronizing pulses of energy as supplied from the 100 cycle source 15 to section A of the counting channel while the numbers represent those of the rotating wheels in their cyclical operation. The stepped arrangement shown in the figures illustrates the discharge of a capacitor which is effected by means of these pulses of energy. Thus, assuming that the capacitor is fully charged at the zero point of the wheel as illustrated in Fig. 2, each successive pulse serves to discharge the capacitor progressively, so that at the end of ten such pulses the capacitor is fully discharged and, by the action of its circuit, is caused to recharge immediately at the very time that the zero has again appeared. Since the moment of capacitor recharge is simultaneous with the appearance of the zero on the wheel, the zero will be rendered visible or apparent to the exclusion of the other figures through stroboscopic action. Referring further to Fig. 2, it will be noted that the succeeding pulses likewise accomplish the discharge of the recharged capacitor and the zero is caused to re-appear after the succeeding ten pulses. It will be understood that this action should have a repetition rate of about ten times per second or more to take advantage of visual persistence, but less will be also practical.

Figure 3:
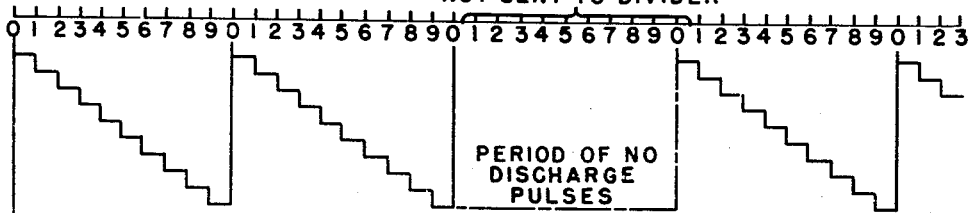
Fig. 3 is a similar view indicating a complete cycle wherein indicating or synchronizing pulses are withheld from the divider.
Figure 4:
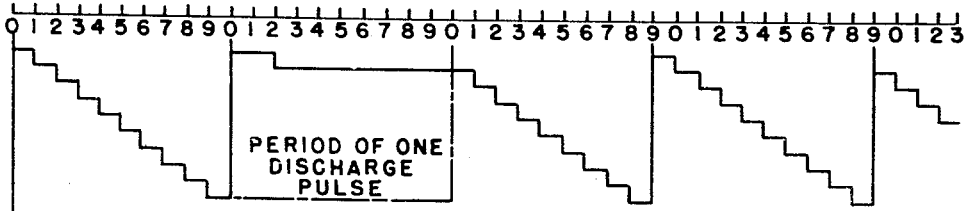
Fig. 4 is a similar view indicating the application to the divider of a single pulse to be counted.

If during the time of a complete cycle of ten pulses, the application of these pulses were to be removed from the capacitor circuit, then their restoration following the blanked-out period would nevertheless restore the recharge time at the zero point. This would hold true only if the condenser charge had not varied during the blanking period. The circuit to be described herein accomplishes this purpose and thus maintains the capacitor in a fixed state of charge by providing substantially no discharge path therefor other than that controlled by the subject to be measured. In Fig. 3 is illustrated a period wherein no discharge pulses are applied to the capacitor so that the resumption of application of these discharge or synchronizing pulses after an integral number of revolutions or tens of pulses maintains the indications at the zero point. As shown, the ten pulses which were omitted, start at the time when numeral "1" would have appeared and the synchronizing or discharge pulses were applied once more when the numeral "1" again appeared. This blanking period offers a means to alter the indicated counts although, as will hereinafter appear, the counts may be applied as well, during the period when pulses are discharging the capacitor. However, considering the blanking period as illustrated in Fig. 3, if one discharge pulse originating from the subject to be counted instead of from the source 15 is applied to the capacitor, the discharge thereof would be accelerated to an extent depending upon the value of this inserted pulse. The value of such subject pulses are arranged to be equal to the synchronizing pulses. Accordingly, when the synchronizing pulses in quantities of ten are restored to their discharging function, the capacitor will become fully discharged at the "9" point as illustrated in Fig. 4. It will, therefore, be apparent that the inserted pulse has changed the phase relationship between the numbered wheel as developed along the top horizontal axis of Figs. 2 to 6, and the capacitor discharge cycle. While the numerals are illustrated as progressing from "0" to "9," the wheels will be rotated oppositely, that is from "9" to "0" so that one discharge pulse from the external source would produce the numeral 1 upon the capacitor recharge.

Figure 5:
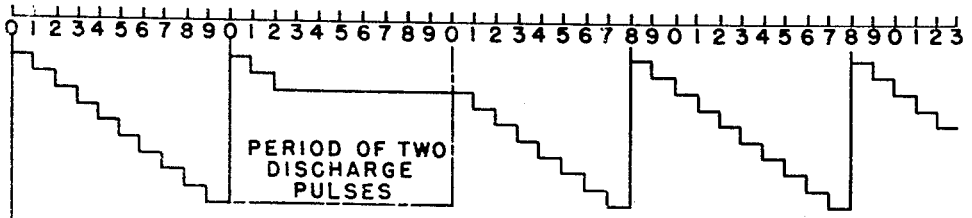
Fig. 5 is a similar view illustrating the application of two pulses to be counted by the apparatus herein.

In Fig. 5 is illustrated a condition wherein two discharge pulses are applied to the capacitor during the blanking period. Thereafter, when the synchronizing pulses are applied, the capacitor will recharge at the "8" point of the wheel so that the numeral 8 will become visible and will appear regularly thereafter as the synchronizing pulses are applied thereto in complete cycles.

Figure 6:
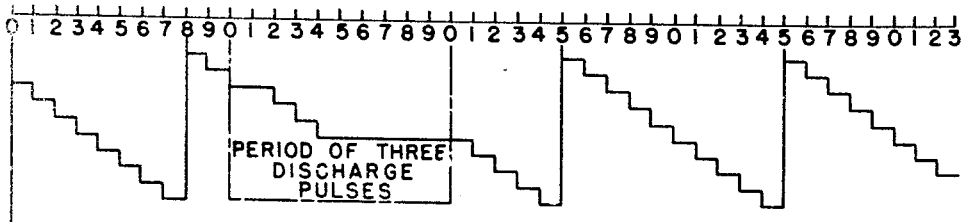
Fig. 6 is a similar view illustrating the addition of 3 pulses or counts to the result obtained in Fig. 5.

In Fig. 6 is illustrated a condition wherein three discharge pulses from the external source, or subject to be counted or measured, are added to the two discharge pulses which were formerly applied as shown in Fig. 5. As illustrated therein, the recharge of the capacitor had occurred at the numeral 8. The three discharge pulses added thereto discharged the capacitor commensurately so that the re-application of the synchronizing pulses caused the recharge of the condenser after only five such synchronizing pulses were applied. Thus, the numeral 5 appeared on the wheel and reappeared continuously thereafter as completed cycles of synchronizing pulses were applied.

It will be observed that since the time of recharge of the capacitor relative to the rotating wheel determines the count that is indicated, any means of displacing the cyclical discharge wave with respect to the numbered wheel will render a different numeral visible.

Figure 1:
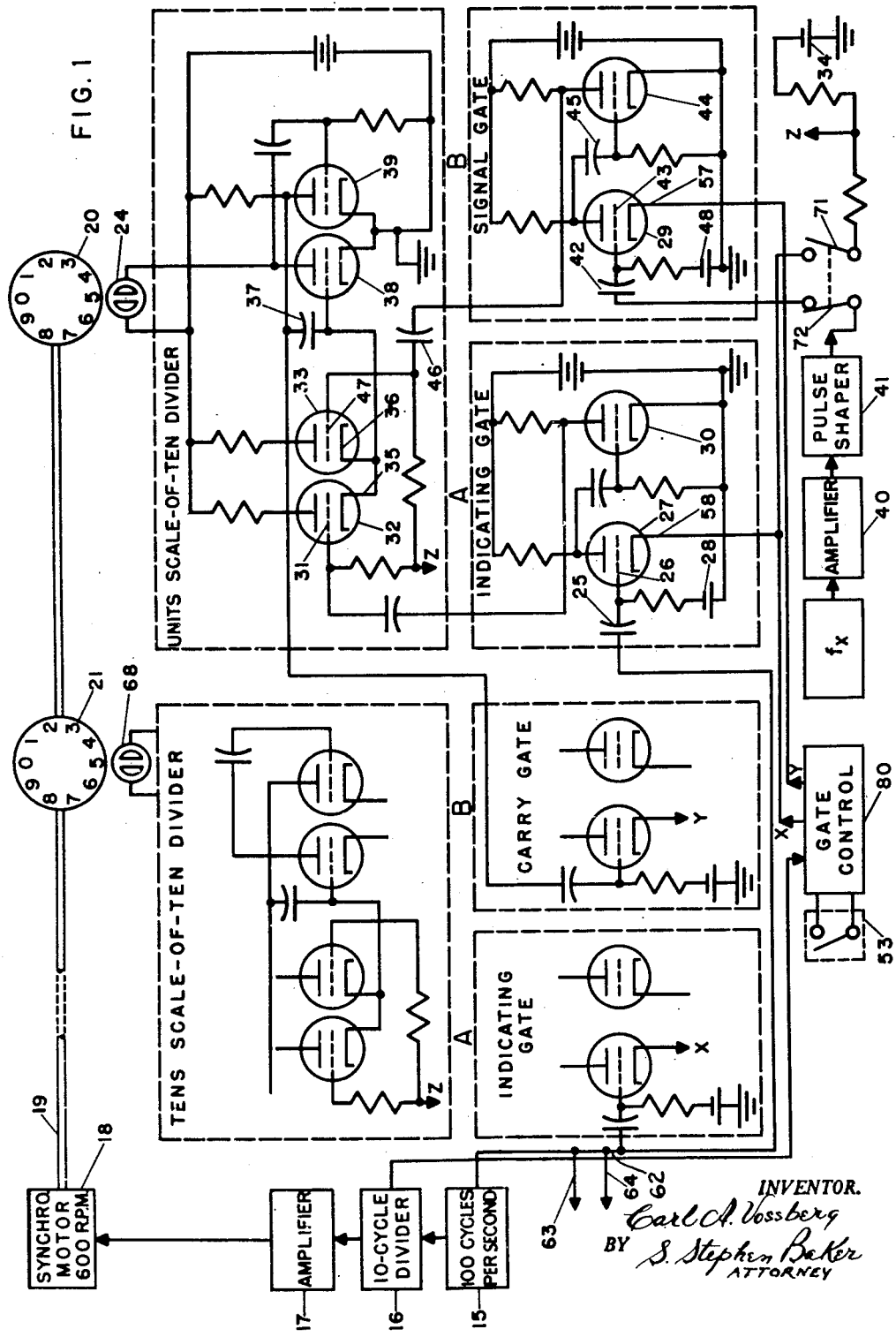

The circuit illustrated in Fig. 1 is operative to effect such accelerated or phase displaced discharge of the capacitor. The synchronizing pulses are applied from the 100 cycle source 15 to path or channel section A through the capacitor 25, to the grid 26 of tube 27. Tube 27 is ordinarily maintained slightly beyond cut-off as by battery 28, although any source of bias may be employed. When positive pulses from the 100 cycle source 15 are fed to the grid 26, the normal fixed bias will be overcome so as to produce output pulses at the plate of tube 27. As will be hereinafter explained, indicating gate tube 27, which is the input tube of the synchronizing pulse channel section A, is selectively operative with the input tube 29 of the subject receiving path or channel B. Gate control means are provided to activate either of these tubes by removing or applying a further disabling bias therefrom selectively. Assuming now that indicating gate tube 27 is in its original, operative state while signal gate tube 29 is disabled, the synchronizing pulses will produce corresponding outputs at the plate of tube 27 as aforesaid. These pulses are applied to tube 30 which functions as a phase inverter so that the output pulses therefrom are positive. However, any type of phase inverter such as transformers or the like may be substituted therefor if the circuit requires such phase inversion. The positive pulses from tube 30 are then applied to the grid 31 of the tube 32. Tube 32 and tube 33 are substantially in parallel, although a single tube or two triodes in a single envelope may be employed. Tubes 32 and 33 are maintained beyond cut-off by battery 34. The function of these tubes is to apply discharge pulses through the cathodes 35 and 36 to the capacitor 37 so as to discharge the same in the manner shown in Figs. 2 to 6. In actual practice, the batteries herein may be supplanted by a single voltage source having suitable taps therein. Battery 34 is applied through the Z connection shown.

Capacitor 37 is included in a multivibrator circuit comprising tubes 38 and 39 which form a two stage amplifier with the output of one coupled to the input of the other. This sets up a condition for oscillation, but capacitor 37 can only be charged in one direction which blocks tube 38. It will be observed that whereas conventional multivibrator circuits include a grid leak resistance forming a time constant with the grid capacitor and determining thereby the frequency of oscillation, the multivibrator circuit shown incorporates no such grid leak or discharge path so that capacitor 37 maintains tube 38 disabled indefinitely until means are provided to discharge or neutralize the charge on capacitor 37. It will be appreciated that such discharge of capacitor 37 will permit the multivibrator to oscillate once so as to immediately recharge the capacitor and again block the tube. The parameters of the circuit are adjusted so that ten pulses from either tube 32 or 33 are required to discharge the fully charged capacitor 37 so as to produce one pulse of oscillation. Hence, for every ten pulses applied to the indicating channel described, one is transmitted thereby. Improvement in stability and greater freedom from effects due to parameter variations can be secured by increasing the supply voltage for tubes 32 and 33 and placing a limiting resistor in series with their grids. The plate load resistors can be made very much greater than the tube resistance and the resultant current will accordingly be substantially independent of tube constants when in the conducting state.

The transmission of one pulse by the oscillation of the multivibrator comprising tubes 38 and 39, flashes neon tube 24 which is included in the plate circuit of tube 38 in place of the usual plate resistor. Thus, every ten pulses from the 100 cycle source 15 will cause the neon tube associated with that particular channel to flash, unless a pulse or voltage from another source is applied to the capacitor 37 to accelerate its discharge and cause the neon tube to flash before a full ten pulses have been applied thereto from source 15. It will be recognized that other gas or similarly functioning light flashing tubes may be employed.

Means for introducing such other excitation derived from the subject to be measured is provided in path or channel section B of the dual channel arrangement for each rotating wheel. The introduced intelligence, in this case an unknown frequency, is applied a voltage as $f_x$ through amplifier 40 to pulse shaper 41. The term "intelligence" refers of course to the introduced signal or subject to be measured whether it is a wave of particular frequency, a number in the form of electrical energy, or any other voltage to be analyzed since any subject to be measured takes the form of a voltage in the apparatus. The function of pulse shaper 41 is to coordinate the value of the introduced pulses with that of the synchronizing pulses. Otherwise stated, the introduced pulses or other input voltage should have the same effect on the discharge decrement as that of a normal synchronizing pulse. The output of pulses shaper 41 is applied through capacitor 42 to the grid 43 of tube 29 which functions as the signal gate. The output of tube 29 is applied to phase inverter tube 44 through the coupling capacitor 45. Tube 29 is maintained beyond its cut-off point by battery 48 which may be the same voltage source as battery 28. As will hereinafter appear, tube 29 is controlled through auxiliary means so as to be considerably below cut-off so that input pulses from the subject to be measured are of insufficient amplitude to permit tube conduction except through the agency of said gate control means. Assuming, however, that tube 29 is not thus disabled, and receiving section B of the counting wheel channel is operative, output pulses from the plate of tube 44 will be applied through coupling capacitor 46 to the grid 47 of the tube 33. Since tube 32 and 33 are substantially in parallel, the output of tube 33 in response to the excitation from section B will be applied to capacitor 37 as a discharge decrement in like manner as the synchronizing pulses from tube 32. It may be seen, therefore, that any pulses or other voltages introduced through section B will cause an acceleration of subsequent discharge of capacitor 37 so as to produce the correspondingly accelerated flash of the neon tube 24 in respect to the rotating indicia bearing wheel 20. Thus, the action hereinabove outlined for changing the phase relationship between the numbered wheel and the capacitor discharge cycle in accordance with the value of the introduced intelligence, is accomplished.

Figure 8:
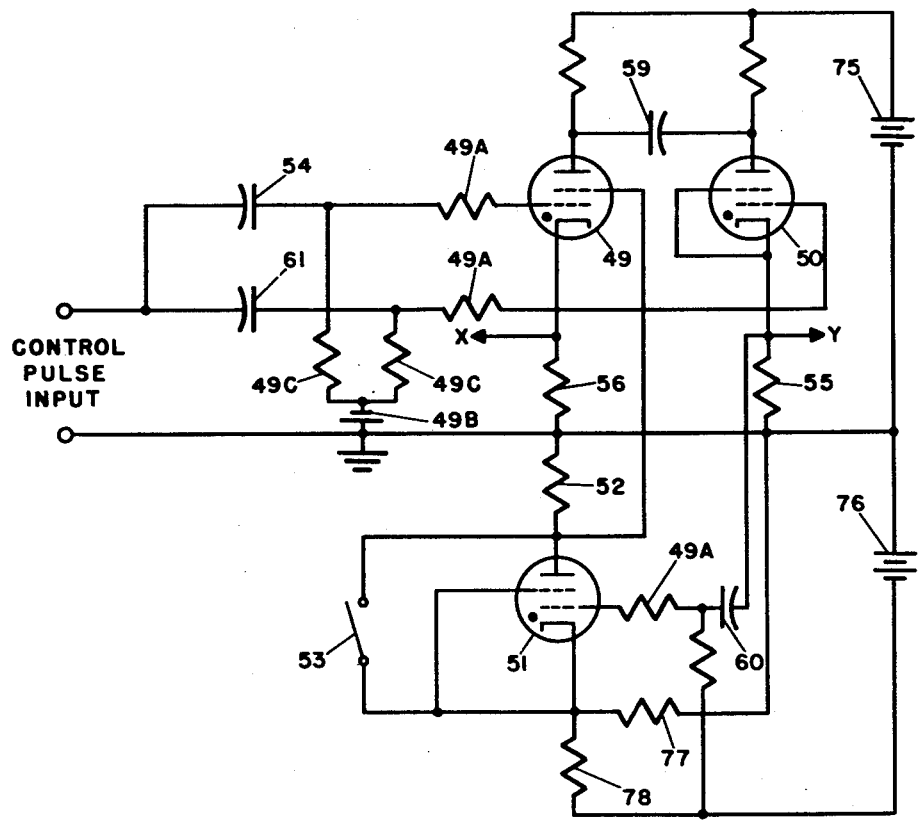
Fig. 8 is a schematic circuit diagram illustrating a control apparatus for actuating the counting or indicating channels.

The apparatus herein described has two stable conditions during its operation. These conditions are first the absorbing or receiving of counts through section B, and thereafter the indication of those counts through section A. Control means for activating either of these sections are provided by gate control 80 comprising the control tubes 49, 50 and 51, as illustrated in Fig. 8. Tubes 49 and 50 comprise a flip-flop type of trigger circuit wherein either one, but not both, of these tubes can be conducting at any one time. Normally tube 50 is conducting and tube 49 is in a non-conducting state by virtue of the screen-grid bias developed across resistor 52 when tube 51 is fired or when operate switch 53 is closed. The usual grid current limiting resistors 49a are provided while battery 49b provides the proper bias through grid resistors 49c. Battery 75 serves as the B voltage supply for tubes 49 and 50, and battery 76 is the B supply for tube 51. Resistors 77 and 78 are voltage dropping resistors to secure proper bias in tube 51. Tubes 49, 50 and 51 are illustrated as being gas tubes of the Thyratron type, although ordinary vacuum tubes may be used. Inasmuch as tube 49 is normally in the non-conducting state, positive pulses from divider or multivibrator 16 applied through capacitor 54 can not fire this tube unless the screen-grid bias is removed. Due to the normal condition of the flip-flop circuit and since tube 50 is conducting, voltage is developed across cathode load resistor 55 at point Y instead of across cathode load resistor 56 at point X. Since the point Y is connected to the cathode 57 of tube 29, this tube will accordingly become biased far beyond its cut-off point so as to be unresponsive to any pulses originating from the subject to be measured. Conversely, lack of voltage at point X, which is applied as bias to the cathode 58 of tube 27, will permit said tube to remain in its slightly cut-off state so as to be responsive to the synchronizing pulses. Thus, in the condition described the apparatus is functioning in an indicating state and not in a count absorbing or receiving state since the signal gate is disabled while the indicating gate is operative. At every operation, the operate switch 53 must first be closed in order to extinguish tube 51. This does not in any way alter the biased condition of tube 49. Thence, upon the opening of the switch, the screen grid bias on tube 49 becomes zero, and the very next positive pulse from the ten cycle multivibrator 16 will fire tube 49 which will in turn extinguish tube 50 through coupling capacitor 59. The resultant current through resistor 56 will cause a blocking voltage to be applied to the cathode 58 of tube 27, whereas the cathode 57 of tube 29 will be restored to substantially ground potential. Therefore, the opposite condition will be in effect wherein channel section A is inoperative due to the blocking of tube 27, while channel section B will deliver pulses to tube 33 for discharge of capacitor 37.

At the next positive pulse from the multibrator 16, tube 50 will again be fired, thereby extinguishing tube 49 and firing tube 51 through capacitor 60. This action restores the screen-grid bias to tube 49 and the circuit returns to its original condition. It will be observed that the control circuit comprising tubes 49, 50 and 51 is put into operation by two successive pulses from ten cycle multivibrator 16. Such source of operation is utilized when the device is to function as a frequency meter or similar apparatus, since it will be evident that the interval between two successive pulses from multivibrator 16 is exactly one tenth of a second and the number of pulses from the source $f_x$ which are applied to tube 33 during this interval will be the measure of the frequency of $f_x$. In other applications tubes 49, 50 and 51 may be energized through other appropriate means.

Wheels 21, 22 and 23 et seq. are provided with counting channels and gates similar to that described. Each such succeeding divider, however, is actuated by a preceding divider, rather than by input pulses directly from the unknown frequency $f_x$. Thus, pulses at the repetition rate, or frequency of the original signal $f_x$ will be passed by the signal gate tube 29 to the phase inverter tube 44 and thence to the capacitor discharging tube 33 during the one-tenth second interval that the channel section B, as represented by the signal or carry gate and divider is active. After every ten pulses applied to the multivibrator tube 38 through its blocking capacitor, one pulse is sent to the next divider through a carry gate which duplicates the gate tube 29 of signal gate channel B. It will be noted that the point Y of the gate control is connected to section B of each counting channel while point X is connected to the section A of each such channel. Each succeeding carry gate of the cascaded dividers will be actuated by one pulse after ten have been applied to the preceding counter. If desired the carry gates of each succeeding channel section B may have an amplifier 40 and a pulse shaper 41 for the purpose described above. For every ten pulses sent to one divider, one pulse goes to the succeeding divider and so on until one-tenth of a second later when all the sections B will be blocked by voltage from point Y, and the indicating or synchronizing pulses from the multivibrator 15 will be passed once more to every divider so as to restore the synchronization of the rotating wheel cycle and the neon tube flashing circuit. Prior to such restoration it will be recognized that the repetition rate of the light flashing circuit is varied during one of its cycles according to the subject which is being counted. The variation, however, need not be confined to one cycle but may extend over many cycles. The variation of repetition rate is accomplished by the acceleration of one cycle through the addition of signal pulses although delay will be likewise effective.

In the indicating position, the corresponding channel sections in each divider will be operating identically, whereas in the condition wherein counts are absorbed or received, the first divider is coupled to the signal source, the frequency of which is measured for one-tenth of a second, and the other dividers are coupled to a preceding divider to obtain the number of "carrys." At the termination of this period, all dividers are re-switched automatically to the indicating state and the wheels will show the number of accumulated counts or cycles which have occurred during this one-tenth second period. The result will be one-tenth of the frequency of the incoming signal and will appear as a number on the stroboscopically indicating wheels.

Referring to Fig. 7, the counting or indicating wheels 20, 21, 22 and 23 comprise annular members preferably, but not necessarily, of a transparent or translucent material such as glass or a synthetic resin such as Lucite, on which are inscribed the numerals 0 to 9 or any other desired symbols. Neon tube 24 is disposed within the annulus of wheels 20 and neon tubes 68, 69 and 70 are similarly disposed in their wheels. Each neon tube is fed by the respective units, tens, hundreds, or thousands scale-of-ten divider, assuming that the apparatus comprises four such dividers.

The disposition of the neon tubes within the wheels offers considerable operating advantages inasmuch as the neon tubes are concealed and protected against damage while the wheels may be conveniently mounted adjacent each other without creating mutual interference of the tube flashes. If desired, doors or baffles may be provided between wheels to confine the effect of the flashes to the appropriate wheel. The transparency of the wheels permits such concealed and convenient disposition of the tubes while providing a clear indication of the numerals through stroboscopic action.

In Fig. 7, which is a block diagram of a substantially complete system, the gate control is not illustrated as actuated by the 10 cycle source 16 since other adaptations may require actuation thereof by other agencies, such as by the means of the subject being measured. Pulse shapers, and amplifiers for the carry gates of channels succeeding the first are not provided inasmuch as the output pulses from the multivibrators are consistent and regular. The wires 62, 63 and 64 leading from the 100 cycle source 15 are connected to the indicating gates of the succeeding channels for synchronisation, or indicating purposes.

It is apparent that between operations the apparatus may be required to be returned to a zero position of the counters preparatory to a new operation. The re-setting of the counters to zero position involves the return of the random divider-cycle phases to a common condition with respect to the positions of the rotating wheels. This may be accomplished by discharging the capacitor 37 of each channel to the minimum point by reducing or cancelling the voltage of battery 34. Return to an indicating position may be automatically accomplished by the gate control at precisely the correct moment after such re-setting.

Referring to Fig. 1, when the re-set switch 71 is closed, the X voltage from the control tube 49 will neutralize the battery 34 potential so as to permit the discharge of capacitor 37. The same effect will be achieved in the following dividers through the point Z connection at re-set switch 71. It will be noted that the Z connection supplies the potential of battery 34 to each multivibrator blocking capacitor and serves to reduce the effective bias on tubes 32 and 33 when the re-set switch is closed. This reduction of bias permits these tubes to conduct so as to discharge the blocking capacitor to the desired value. The gate control means described will thus accomplish the re-setting function and will then re-switch to the indicating position as required. During this re-setting operation no transmission of pulses to the divider will be permitted by virtue of switch element 72 which is ganged to re-set switch 71 and which cuts off the pulse shaper 41 during a re-setting operation.

The apparatus herein described can function as an interval meter so as to measure the elapsed time between any two pulses. Thus, the device can determine the time of opening and closing of contacts or the time between any two operations, or any condition wherein an interval can be defined by its start and finish. In addition the device may be arranged to control a succeeding operation when a predetermined interval between two pulses occurs.

Operation as an interval meter is essentially the reciprocal of a frequency meter. The two pulses, the interval between which is to be measured, are applied successively through coupling capacitors 54 or 61 by means of an amplifier if desired to the gate control. Simultaneously a standard source of frequency is applied at point $f_x$. As an example, if the time interval between two incoming pulses were 0.156 second apart, the first pulse would operate the gate control allowing the standard frequency pulses to pass to the counter. The second pulse arriving 0.156 second later would stop the reception of the standard frequency pulses and the device is automatically switched back to indicating. The standard frequency may be conveniently set at precisely 1,000 cycles per second, whereby exactly 156 pulses will be counted by the apparatus during the activation of section B by the interval start and finish and this number will be shown on the wheels. This will then, of course, indicate that the interval was .156 second.

As an electronic adding machine the device will be substantially that hereinabove described. During stand-by periods, indicating is continuously effected through the feeding of synchronizing pulses simultaneously to all the dividers through lead wires 62, 63 and 64 as well as to the first divider. Thus, at the starting point the wheels will all have their zero numerals showing. As previously described, each divider-counter is so connected during the receiving or adding process that for each ten pulses received in the "units" divider-counter, one is transmitted to the "tens" divider-counter and so on.

As an example if it were desired to add a column of figures wherein the first number is 278, these numbers may be depressed upon a suitable key board and the "add" button pushed. One method of accomplishing the foregoing is to allow two pulses of discharge to be applied to the "100's" divider-counter, seven such pulses to the "10" divider-counter and eight pulses to the unit divider. As an alternative, predetermined, but different voltages may be applied to the several capacitors which would be equivalent to the aggregate value of the applied pulses since it can be understood that any method of changing the phase relationship of the blocking capacitor or light flashing circuit, and the indicating wheel would effect the desired result. In the first method of addition described, however, the pulses may be injected very rapidly in the succession 2—7—8, or in the reverse succession 8—7—2, whereupon the apparatus may be automatically returned to the indicating position wherein synchronizing pulses are sent to all the dividers. It is not necessary to apply the numbers discretely because a very short and automatic time delay of an electrical nature can be provided in the divider output to prevent interference between counts and carrys. An alternative could be the syncopation of the incoming pulses. However, for explanatory purposes, it will be assumed that additions occur as noted above.

It should be observed that the control circuit herein maintains each divider independent in the indicating position so that the application of synchronizing pulses merely maintains the cyclic synchronism of the neon tube circuits and indicating wheels. If this were not done, the application of synchronizing pulses would cause each counter to carry over the succeeding counter in series of ten and would distort the result of the computations. However, since in the indicating condition tube 29 is disabled, no synchronizing pulses can be transmitted to the succeeding counters. It should be observed, however, that an arrangement is feasible wherein the counters are not thus independent and wherein the apparatus operates on a system of "9's," and conversion to "10's" is effected by additional pulses.

If the second number of the list was 364, these numerals would be depressed and the "add" key again pushed. The indicating channel section will thereupon be disabled once more while three pulses will be sent to the hundreds divider, then, six pulses to the tens. It will be observed that this will discharge the tens capacitor at the third pulse, thereby automatically recharging the same to maximum and then dropping down three more steps. The recharging of the tens divider capacitor transmits a pulse to the hundreds divider so that in all four pulses are applied thereto by the addition of the second number. Similarly, when two of the four pulses from the last numeral of the number 364 are fed to the units divider, the capacitor will be recharged at the second pulse so as to add another pulse to the tens divider and will drop down two more discharge decrements. It will be appreciated that this operation takes place in a fraction of a second. After the final pulse has been sent, the device is automatically converted to the indicating position. The entire time for receiving counts may be an integral number, probably one, of revolutions of the wheels. Summarizing the operation of the electronic adding machine, the following steps have taken place:

```
  2—7—8
  3
  —————
  5—7—8
      6
  1
  —————
  6 3 8
      4
    1
  —————
  6 4 2
``` which obviously is the desired result.

Subtraction by the method herein outlined may be effected by using the 9-complements system. Subtraction may also be effected by rotating the wheels in the opposite direction so as to give the 10-complements of each number. Adding further numbers will appear as complements, which is subtraction. Means must be provided, however, to correct for improper carrys as is well understood. In a 9-complements system, the operations are similar to those previously described, but the depression of the subtraction lever will cause the 9-complements to be added. As will be apparent to those skilled in the art, the first column of the subtracted figures must send a pulse to the last when "9" is exceeded.

I have shown a preferred embodiment of my invention, but it is obvious that numerous changes and omissions may be made without departing from its spirit. For example, while I have described the counter or scaling device as a multivibrator wherein an indicating channel effects the discharge of a blocking capacitor at a synchronous repetition rate, and wherein this repetition rate is momentarily varied during or after the application of the subject to be measured, it is apparent that a blocking oscillator having a similar capacitor in its grid circuit will serve the same function. In fact, any type of scaling or counting device can be used which will effect a variation of phase relationship between the neon tube actuating circuit and the cyclical rotation of the counting wheels. Thus, a glow tube counter, or conventional multivibrator scaling devices, may vary a capacitor charge in the neon tube circuit which is flashed thereby. The principle of thus varying the phase relationship may be utilized in other types of indicating devices employing synchronism between two elements for indicating intelligence upon one of them. In fact, since the readings actually indicate the phase, measurement of phase can be done directly.

I claim:

1. Measuring apparatus comprising a series of rotating indicia bearing wheels, light flashing members stroboscopically associated with said wheels for rendering selected portions of said wheels apparent, electrical circuit means for actuating each said light flashing members, each of said electrical circuit means including an oscillator and a capacitor therein associated with its light flashing member, said oscillator being operative by a predetermined change in the charge of said capacitor for flashing its associated flashing member, means to effect said predetermined change at a repetition rate synchronized with the frequency of rotation of said wheels, means to vary the repetition rate of at least one of said predetermined changes so as to change the phase relationship of said repetition rate and said wheel frequency rotation whereby correspondingly varied portions of said wheels are rendered apparent, input means for introducing an electrical subject to be measured, and means to effect said variation of repetition rate by said introduction.

2. Measuring apparatus comprising a series of rotating indicia bearing wheels, light flashing members stroboscopically associated with said wheels for rendering selected portions of said wheels apparent, electrical circuit means for actuating each said light flashing members, each of said electrical circuit means including an oscillator and a capacitor therein associated with its light flashing member, said oscillator being operative by a predetermined change in the charge of said capacitor for flashing its associated flashing member, frequency control means common to both said rotating wheels and said electrical circuit means whereby said predetermined change is effected in synchronism with an integral number of revolutions of said wheels, input means for varying said synchronisation during an interval of time, said variation being a function of an input subject to be measured, and means to restore said synchronisation after said interval of time.

3. An electrical measuring instrument comprising a cascaded series of frequency dividers, a rotating, numbered wheel for each divider, a light flashing member stroboscopically associated with each said wheel, means to effect synchronisation of rotation of said wheels with the flashing of said members so as to normally render a specific number of each rotating wheel visible, input means for introducing an electrical quantity to be measured into the first of said cascaded dividers, said introducing means being operative to momentarily vary said synchronisation whereby said synchronisation is re-established so as to render a number visible on said wheel depending upon said variation of synchronisation, said first divider being adapted to transmit the divided subject to the succeeding divider so as to vary its synchronism of wheel rotation and light flashing correspondingly, similar transmissions of further divisions of the subject being effected throughout the cascaded dividers.

4. Electrical measuring apparatus comprising a cascaded series of rotating indicia bearing wheels, light flashing members stroboscopically associated with said wheels, electrical circuit means for actuating each of said light flashing members, a relaxation oscillator in each said electrical circuit, a capacitor arranged to block said oscillator at each oscillation thereof and having no discharge path in said oscillator whereby the normal frequency of said oscillator is substantially zero, means external of said oscillator for supplying a controlled discharge path for said capacitor, and input means for receiving an electrical voltage to be measured, said electrical voltage being arranged to be effectively added to the controlled discharge path of said capacitor so as to vary its time of discharge accordingly whereby each said light flashing members is caused to flash at relative times corresponding to the value of the voltage being measured.

5. Electrical measuring apparatus comprising an indicia bearing member, cyclical means for effecting periodic progression through the indicia of said member, indicating means for selecting a portion of said member to be indicated, a relaxation oscillator feeding said indicating means whereby each oscillation thereof operates said indicating means, means to control the frequency of said relaxation oscillator so that said indicating means is synchronized with the cyclical operation of said member, a reactance in said relaxation oscillator adapted to block oscillations thereof when charged, said frequency controlling means being operative to discharge said reactance at pre-determined, synchronized intervals, a count receiving channel, means to transform received counts into discharge decrements and apply said decrements during a period of time to said reactance additively with the discharging function of said frequency controlling means whereby the resulting acceleration of discharge interrupts said synchronization, said frequency controlling means re-establishing said synchronization after said period of time of said application of discharge decrements.

6. Measuring apparatus comprising a cascaded series of rotatable numbered wheels, light flashing tubes stroboscopically associated with said wheels, means for effecting rotation of said wheels and the flashing of said tubes in synchronism whereby specific numbers of said wheels are rendered apparent during said rotation, an electrical circuit for actuating each of said tubes, a relaxation oscillator in each of said circuits, a capacitor in each said oscillator and adapted to be charged so as to block said oscillator at each oscillation thereof, means to discharge said capacitor at regularly spaced intervals, said discharge being arranged to flash the tube associated with its circuit whereby said regularly spaced discharge makes a single number apparent on the wheel associated with said tube, and a count receiving circuit connected into said electrical circuit and operative to apply discharge decrement voltages to said capacitor in accordance with the amplitude of an electrical voltage to be measured whereby the time of discharge thereof with respect to the rotating wheel is modified, each of said electrical circuits being cascaded to apply counts to a succeeding circuit and being operative to electrically divide said applied counts and to apply the divided counts to each succeeding circuit until the last circuit, said divided counts applied to each of said succeeding circuits serving to modify the time of discharge of its blocking capacitor.

7. Measuring apparatus according to claim 6 including control means for selectively rendering operative either said regularly spaced interval discharging means or said count receiving circuit application of discharge decrements whereby the operation of said spaced interval discharging means may be interrupted to allow the application of said discharge decrements and may be automatically resumed after an interval of time determined by the operation of said control means.

8. Measuring apparatus according to claim 6 including control means for selectively rendering operative either said regularly spaced interval discharging means or said count receiving circuit application of discharge decrements, means to apply said discharge decrements in the form of discrete pulses and means to apply operating impulses to said control means, said operating impulses being spaced apart by a pre-determined interval of time whereby the number of discharge decrements discretely applied to said capacitor during said interval is a measure of the frequency of said discrete discharge decrements.

9. Measuring apparatus comprising a cascaded series of rotatable numbered wheels, light flashing tubes stroboscopically associated with said wheels, means for effecting rotation of said wheels and the flashing of said tubes in synchronism whereby specific numbers of said wheels are rendered apparent during said rotation, an electrical circuit for actuating each of said tubes, a relaxation oscillator in each of said circuits, a capacitor in each said oscillator and arranged to be charged so as to block said oscillator at each oscillation thereof, means to discharge said capacitor at regularly spaced intervals, said discharge being arranged to flash the tube associated with its circuit whereby said regularly spaced discharge makes a single number apparent on the wheel associated with said associated gas tube, and a count receiving circuit connected into said electrical circuit and adapted to apply discharge decrement voltages to said capacitor of a known frequency whereby the time of discharge thereof with respect to the rotating wheel is modified as to change the previous phase relationship of the synchronized wheel rotation and tube flashing and make a corresponding number of the wheel apparent by the flashing tube, control means for selectively rendering operative either said regularly spaced interval discharging means or said known frequency discharge decrements and means to apply two operating impulses to said control means, said operating impulses being spaced apart a period of time the duration of which is to be measured whereby said first operating impulse permits the application of said known frequency discharge decrements and said second impulse stops said application so that the number of known frequency discharge decrements applied during said two impulses is a measure of the time of said interval.

10. Electrical measuring apparatus comprising a cascaded series of rotating indicia bearing wheels, light flashing members stroboscopically associated with said wheels, electrical circuit means for flashing said light members so as to render a specific portion of each said wheels visible, a one hundred cycle frequency pulse source, a first electrical path for each light flashing member, said first electrical path being arranged to receive said pulses, each of said electrical circuit means being adapted to divide said pulses in a scale of ten ratio and to flash said light members thereby, means to rotate said wheels one revolution for each resulting divided pulse so as to maintain synchronism between said rotating wheels and said flashing of said light members, and a second electrical path for supplying pulses to said electrical circuit means to be similarly divided thereby and to be added to said one hundred cycle divided pulses, control means for selectively rendering operative either said first electrical path or said second electrical path, each of said electrical circuit means being mutually independent when said first electrical path is operative so as to permit visibility of numbers recurring in synchronism with the flashing of said light members, said electrical circuit means being mutually interconnected when said second electrical path is operative, said interconnection being adapted to subdivide the divided output of each electrical circuit means until the last thereof whereby scale-of-ten dividers are provided in cascaded relationship.

11. Measuring apparatus according to claim 10 including a relaxation oscillator in each electrical circuit, a blocking capacitor in each relaxation oscillator to be charged upon each oscillation thereof, said first electrical path being adapted to supply stepped discharge decrements in series of ten, said second electrical path being adapted to supply stepped discharge decrements according to a voltage to be measured, all said discharge decrements having the same capacitor discharging value.

12. Measuring apparatus according to claim 11 wherein said control means comprises a trigger circuit having two stable operating conditions, means to supply two pulses thereto for maintaining said trigger circuit in one of its conditions during the interval between said two pulses, said trigger circuit being adapted to produce disabling bias voltages for either of said electrical paths depending upon its condition of stability as determined by said two pulses.

13. Measuring apparatus comprising a series of rotating indicia bearing wheels, light flashing members stroboscopically associated with said wheels for rendering selected portions of said wheels apparent, electrical circuit means for actuating each said light flashing members, each of said electrical circuit means including a capacitor associated with its light flashing member, means responsive to a predetermined change in the charge of said capacitor for flashing its associated flashing member, frequency control means common to both said rotating wheels and said electrical circuit means whereby said predetermined change is continuously effected in synchronism with an integral number of revolutions of said wheels, voltage receiving and applying means for adding charges to said capacitor, said voltage receiving means being arranged to add said charges during a period of interruption of the application of said control means to said electrical circuit means, said voltage receiving means being adapted to leave said capacitor in a state of charge depending upon the voltage to be measured, whereby the restoration of said control means to said electrical circuit means after said interruption produces the first predetermined change of the capacitor thereof at an earlier time depending upon the charge left thereon on said capacitor, each of said electrical circuit means until the last thereof feeding a succeeding electrical circuit means in a cascaded divider relationship so as to similarly accelerate the first predetermined change in the charge of their capacitors after said restoration.

14. Measuring apparatus according to claim 13 including a gate control trigger circuit for selectively rendering operative either said control means or said voltage receiving means by producing disabling voltages selectively applied thereto, said disabling voltages being additionally operative to reduce all of said capacitors to a common state of charge when an operation is concluded.

15. Electrical measuring apparatus comprising a cascaded series of rotating indicia bearing wheels, light flashing members stroboscopically associated with said wheels, electrical circuit means for actuating each of said light flashing members cyclically so as to render specific portions of said wheels visible, a relaxation oscillator in each said electrical circuit means, a capacitor in each oscillator and being operative to block said oscillator at each oscillation thereof and having no discharge path in said oscillator whereby the normal frequency of said oscillator is substantially zero, a capacitor discharge circuit having a frequency of operation synchronized with the rotation of said wheels and connected to said capacitor so as to discharge said capacitor at each cycle of the capacitor discharge circuit whereby said oscillator is provided with said rotating wheel frequency so as to render a particular portion of each wheel visible, input means for receiving an electrical voltage to be measured, said input means being operative to apply said electrical voltage to said capacitor so as to accelerate the discharge thereof to a degree depending upon the amplitude of said voltage being measured whereby said light flashing members render visible specific portions of said wheels according to the acceleration of discharge effected in each electrical circuit means, each relaxation oscillator up to the last thereof being connected to a succeeding electrical circuit means so as to feed an impulse thereto when caused to oscillate by the discharge of its capacitor, said impulses serving to accelerate the discharge of the capacitor in the electrical circuit means fed thereby.

CARL A. VOSSBERG.

REFERENCES CITED

The following references are of record in the file of this patent:

UNITED STATES PATENTS

| Number | Name | Date |
|---|---|---|
| 1,933,650 | Bascom | Nov. 7, 1933 |
| 2,184,355 | Libman | Dec. 26, 1939 |
| 2,278,993 | Johnson | Apr. 7, 1942 |
| 2,346,251 | Bryce | Apr. 11, 1944 |

FOREIGN PATENTS

| Number | Country | Date |
|---|---|---|
| 542,927 | Germany | Feb. 3, 1942 |